Oct. 18, 1966  E. C. WORTZ ETAL  3,279,201
METHOD OF AND MEANS FOR CONTROLLING BODY TEMPERATURE
Filed May 11, 1964  5 Sheets-Sheet 1

INVENTORS;
EDWARD C. WORTZ,
RONALD H. LEE,

Fig. 5.
- CONDENSATION OF PERSPIRATION.
- RETURN OF CONDENSED PERSPIRATION BY CAPILARY ACTION.
- ENTRAINED PERSPIRATION VAPOR.
- EVAPORATION OF PERSPIRATION.

Fig. 6.

INVENTORS:
EDWARD C. WORTZ,
RONALD H. LEE,

Oct. 18, 1966

E. C. WORTZ ETAL 3,279,201

METHOD OF AND MEANS FOR CONTROLLING BODY TEMPERATURE

Filed May 11, 1964

INVENTORS:
EDWARD C. WORTZ,
RONALD H. LEE,

Oct. 18, 1966    E. C. WORTZ ETAL    3,279,201
METHOD OF AND MEANS FOR CONTROLLING BODY TEMPERATURE
Filed May 11, 1964    5 Sheets-Sheet 5

INVENTORS:
EDWARD C. WORTZ,
RONALD H. LEE,

United States Patent Office 3,279,201
Patented Oct. 18, 1966

3,279,201
METHOD OF AND MEANS FOR CONTROLLING
BODY TEMPERATURE
Edward C. Wortz, Northridge, and Ronald H. Lee, Manhattan Beach, Calif., assignors to The Garrett Corporation, Los Angeles, Calif., a corporation of California
Filed May 11, 1964, Ser. No. 366,527
20 Claims. (Cl. 62—62)

This invention relates generally to the art of ventilating environmental suits of the type adapted to be worn by personnel in corrosive, high temperature, and other environments which are harmful or otherwise unfavorable to human life. The invention relates more particularly to a method of and means of ventilating an environmental suit in such a way as to reduce the latent heat load on the wearer.

Under normal conditions, the heat of the human body is maintained by the metabolism of foodstuffs and body tissue. The body gains and loses heat by various mechanisms including radiation, convection, evaporation, and conduction. The rate at which the body gains and loses heat, and hence the total body heat, is determined by the relevant conditions, such as metabolic rate, ambient temperature, body mass, and body surface area. Generally, most heat gain and loss by the human body occurs by radiation and convection. Evaporation, however, is the most important parameter controlled by the body to regulate body heat and temperature.

Maintenance of the proper heat and temperature of the human body, then, is dependent, in part, upon the existence of the proper ambient thermodynamic conditions. If the body is exposed to abnormal ambient thermodynamic conditions which inactivate its heat elimination mechanisms, the body heat and temperature may increase. Excess heat storage in the body produces several effects. Certain of these effects are purely pathological in nature. Other of the effects are compensatory in nature and tend to enhance the thermodynamic heat elimination mechanisms of the body. Such compensatory effects are regulated in the hypothalamus and are stimulated by sensory receptors in the skin and blood stream.

Two compensatory effects of excess heat storage in the body are dilation of the blood vessels near the skin surface and sweating. Dilation of the blood vessels provides a peripheral cooling action. Sweating creates an evaporative cooling action. Sweating is controlled by the hypothalamic regulation system which maintains the secretion of sufficient moisture to the skin surface to maintain the proper body temperature, or core temperature as it is commonly referred to, as long as the supply of moisture in the body remains sufficient to meet the demands of the hypothalamic system and the atmosphere continues to evaporate the secreted moisture from the skin. Prolonged sweating, however, may continue to the point of dehydration, in which case the secretion of body moisture to the skin surface, and hence the evaporative cooling action, diminishes and the total body heat storage increases. When one to five percent of the body weight has been lost through heat and dehydration, a person experiences intense thirst, rapid pulse, and rapid shallow respiration. As the body heat storage increases, five to ten percent of the body weight may be lost through dehydration, at which point a syndrome involving indistinct speech, blurred vision, inability to stand, and mental confusion may be observed. Further heat storage causes physical collapse, an increase in body temperature, delirium, and death. Other serious biological effects occur during the dehydration process and the resultant increase in body heat storage.

The dehydration process accelerates as it proceeds. Thus, the body temperature rise occasioned by increasing heat storage increases the metabolic rate and, therefore, heat production in the body. The resultant rise in temperature of the body tissues, in turn, further increases the metabolic rate, thereby producing a further increase in heat production. A point can be reached in this accelerating dehydration process where the latter becomes irreversible regardless of the degree of external cooling applied to the body. Under these conditions, the body temperature rises to 106° F. to 108° F. and death ensues.

In a conventional ventilated environmental suit, cool air or oxygen is simply recirculated through the suit for the purpose of extracting heat from and thereby cooling the body of the wearer. It has been determined, however, that this method of suit ventilation is totally inadequate and presents a distinct safety hazard in many of the environments in which modern environmental suits are required to be worn and under the conditions of physical activity demanded in these environments. Thus, the interior of an unventilated environmental suit presents an abnormal thermodynamic environment to the body of the wearer which tends to inactivate the normal mechanisms of heat elimination of the body and thereby increase heat storage in the body. This increase in body heat, in turn, causes the hypothalamic regulation system to initiate or accelerate the biological compensatory effect of sweating. The existing methods of suit ventilation attempt to restore normal heat elimination to the body, and thereby maintain proper body heat, by passing cool air or oxygen over the body surface. Recent experiments, however, have demonstrated that with this method of suit ventilation, a high proportion of total body cooling is realized by latent heat extraction from the body, i.e., by evaporation of moisture from the body surface, and only a small proportion of the heat load is removed as sensible heat. As a result, the sweat rate of the body is very high.

Consider, for example, a man wearing an environmental suit which is ventilated in the conventional manner. A typical cooling flow rate for a suit of this type is on the order of 12 cubic feet per minute at 3.5 p.s.i., or approximately 13 pounds per hour, at an inlet temperature to the suit of 50° F. and an exit temperature from the suit of 85° F. Experimental data obtained in the recent tests indicate that under the conditions above, only about 10 percent of the body heat load is removed as sensible heat and the remaining 90 percent of the heat load, or about 1000 B.t.u. per hour, is removed as latent heat. This rate of latent heat extraction requires a sweat rate of about 24 pounds per day. A sweat rate of this magnitude is excessive and if permitted to continue, would result in dehydration with its attendant harmful biological and pathological effects.

Another serious disadvantage of the existing suit ventilating methods resides in the excessive overall power requirement necessary to ensure adequate suit ventilation even under the conditions in which such methods may be safely employed. These high power requirements are due, of course, to the relatively large volumetric cooling flow rate which must be maintained to ensure proper cooling.

It is evident from the preceding discussion that a conventionally ventilated environmental suit may be safely worn only in carefully selected environments and that the type and duration of physical activity the wearer may safely perform are severely limited. This is so even though an abundant drinking water supply is readily available since the thirst response is inadequate to satisfy the increased body moisture requirements occasioned by a high sweat rate. Accordingly, a definite need exists for an improved method and system for ventilating or cooling environmental suits in such a way as to reduce the latent heat load of the wearer.

It is a primary object of this invention to provide such an improved method of and system for ventilating or cooling environmental suits.

A more specific object of the invention is to provide an improved environmental suit ventilating method and system which are effective to remove a high percentage of the total body heat load as sensible heat and only a small percentage of the heat load as latent heat, whereby the sweat rate of the wearer is drastically reduced.

A highly important object of the invention is to provide an improved environmental suit ventilating method and system of the character described which substantially reduce the overall power requirements for proper suit ventilation and cooling.

Another highly important object of the invention is to provide an improved environmental suit ventilating method and system which possess an inherent self-servoing or self-regulating action which automatically regulates body cooling in accordance with the body heat load to be removed.

Another object of the invention is to provide an improved environmental suit ventilating method and system of the character described which permit the suit to be safely worn in a much greater range of unfavorable environments and the wearer to perform more strenuous and prolonged physical activity than the existing suit ventilating methods and systems.

Yet another object of the invention is to provide an improved environmental suit ventilating method and system of the character described which may be tailored to the metabolic and sweat rates of individual wearers.

A further object of the invention is to provide an improved environmental suit ventilating system of the character described which is relatively compact and light weight, does not interfere with the comfort or mobility of the wearer, and may be embodied in either existing or specially constructed environmental suits.

Other objects, advantages, and features of the invention will become readily apparent to those skilled in the art as the description proceeds.

Briefly, the objects of the invention are attained by providing an environmental suit ventilating method and system wherein the ventilating gas flowing through the suit, after traversing each of at least two separate body surface areas of the wearer, is directed into heat transfer relation with a cooling medium and is then directed back into heat transfer relation to the body of the wearer, in such manner that the ventilating gas traversing each of said surface areas is cooled to a predetermined low inlet temperature, prior to entrance of the gas into heat transfer relation with the respective area, less than the temperature at which the gas emerges from the respective area. In this way, the average or effective temperature of the ventilating gas traversing the body is substantially lower than the average or effective temperature of the ventilating gas in a conventional environmental suit wherein the gas traverses the entire encased body surface area of the wearer without recooling. Each recooling cycle of the ventilating gas in the present ventilating method and system also condenses moisture from the gas, with the result that the average or effective humidity of the gas within the suit is less than in a conventional environmental suit. Conceivably, if a sufficient number of cooling cycles are employed in the present invention, the entire body heat load may be removed as sensible heat and the required rate of ventilating gas flow may be reduced to an absolute minimum. To ensure proper flushing of $CO_2$ from the suit, however, it is desirable or essential to maintain at least a predetermined minimum flow rate.

According to a further unique and highly important feature of the invention, a quantity of moisture is continuously maintained in heat transfer relation to the separately cooled surface areas of the body to effect additional heat extraction from the body due to evaporation of the moisture by body heat.

In accordance with the preferred practice of the invention, the cool ventilating gas entering the environmental suit traverses one separately ventilated or cooled surface area of the body, then flows in heat transfer relation to a cooling medium within the suit, and thereafter traverses another separately ventilated area of the body, thereby to provide a cascade cooling method and system. Each such passage of the gas in heat transfer relation to a cooling medium, and each cooling medium, is hereinafter referred to in places as a cooling cycle. An environmental suit ventilating system according to the invention may have two or more cooling cycles, the exact number being dependent upon the heat load to be removed, the sweat rate of the wearer, the environmental conditions to be encountered, and other factors.

According to a further preferred practice of the invention, the moisture which is utilized in the present ventilating method and system to effect evaporative cooling of the body is provided by collecting the body moisture or perspiration which condenses during each cooling cycle and conveying such condensate into heat transfer relation to a body surface area. In this way, a part of the body moisture evaporated from the skin of the wearer may be condensed and then reevaporated a number of times to increase heat removal from the body without increasing the latent heat load, and hence sweat rate of the body.

The present invention, then, permits the removal of any body heat load, without creating an excessive latent heat load, i.e., sweat rate, of the body, in a wide range of environmental conditions, and with minimum power requirements, by employing cooling cycles of the proper number and thermodynamic characteristics. As will be seen, the ventilating method and system of the invention possess, in effect, an inherent self-servoing or self-regulating action which regulates body cooling according to the body heat load to be removed.

A better understanding of the invention may be obtained from the following detailed description of certain presently preferred environmental suit ventilating systems according to the invention, reference being made in such description to the attached drawings, wherein.

Figures 1, 3, 4:
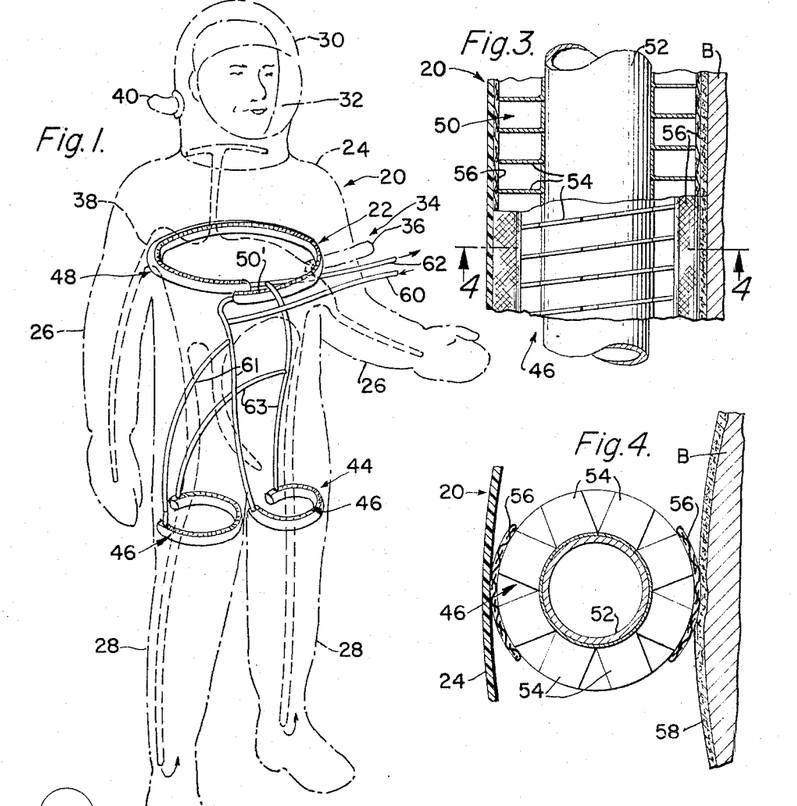
FIG. 1 illustrates an environmental suit ventilating means according to the invention.
FIG. 3 is an enlargement of a portion of one heat exchanger embodied in the ventilating system of FIG. 1.
FIG. 4 is a section taken along line 4—4 in FIG. 3.

In FIG. 1, numeral 20 designates a typical environmental suit of the type adapted to be worn in corrosive, high temperature, and other environments harmful or otherwise unfavorable to human life. Suit 20 is ventilated by an improved ventilating system 22 according to this invention for removing the body heat of the wearer. The environmental suit 20 is essentially conventional and, therefore, has been illustrated in phantom lines. Moreover, the suit will be described only in sufficient detail to enable a full and complete understanding of the present invention.

With this preliminary discussion in mind, the environmental suit 20 will be seen to comprise a body 24 of flexible, impervious material having arms 26 to receive the wearer's arms and legs 28 to receive the wearer's legs. The head of the wearer is enclosed in a helmet 30 which is hermetically sealed to the suit body 24 and provided with a transparent face mask 32. A suit of this type provides a hermetic enclosure for the entire body of the wearer. In some cases, the wall of the suit body 24 may have a multiple thickness and include a thermal insulating layer. In the drawings, however, the suit wall is shown, for convenience, to comprise but a single layer.

Since the respiratory apparatus of the wearer is enclosed by the suit 20, it is necessary to supply breathing air or oxygen to the wearer's face. In addition, as discussed earlier, it is necessary to ventilate the suit to maintain the proper body heat and temperature. In a typical environmental suit of the type illustrated, the breathing air or oxygen supplied to the respiratory apparatus of the wearer serves the additional function of ventilating the siut. To this end, the environmental suit is generally equipped with a system of tubes for conveying the incoming breathing air or oxygen to selected interior points of the suit. The air or oxygen then flows through the space between the wall of the suit and the body of the wearer to the interior of the helmet 30, and is exhausted from the suit, along with the products exhaled by the wearer through a suitable exhaust passage. Different environmental suit designs may utilize somewhat different distribution means for the incoming air or oxygen and conduct the latter to somewhat different points in the suit. While the present ventilation method and system does not require any particular distribution arrangement, that shown in FIG. 1 is preferred in suits of the type illustrated, for reasons which will appear as the description proceeds.

It will become apparent from the ensuing description that the present invention is not limited in application to environmental suits of the type shown wherein the suit ventilating medium is used to support the respiratory functions of the wearer. It is conceivable, for example, that the invention may be utilized in an environmental suit which is designed to be ventilated by a gas other than the air or oxygen which the wearer breathes. In this case, of course, any suitable gas may be employed for ventilation purposes. For this reason, and to simplify the ensuing description, the expression "ventilating gas" rather than the expression "ventilating air or oxygen" will be hereinafter used.

In FIG. 1, the means for distributing the incoming ventilating gas to selected interior points of the environmental suit 20 is designated by the numeral 34. This distribution means comprises a tube 36 through which the gas enters the suit and a system of branch tubes 38 which conduct the gas to the selected interior points in the suit. As shown, this tube system includes a tube extending to the outer end of each arm 26 and a tube extending to the lower end of each leg 28. Leading from the helmet 30 is an exhaust tube 40 through which the ventilating gas emerges from the suit. It is evident, therefore, that the ventilating gas flows upwardly through each arm and leg of the suit into the main trunk portion of the suit, and then through the helmet 30 to the exhaust tube 40.

In some cases, the environmental suit may utilize an open ventilation system, in which event the ventilation gas inlet 36 will receive precooled and dehumidified gas from a source (not shown) and the ventilation gas outlet 40 will exhaust to a suitable receiver, such as atmosphere. In other cases, the suit may utilize a closed ventilation system, in which event the inlet 36 and the exhaust 40 will connect to a reconditioning unit (not shown) which receives the gas emerging from the suit, recools and dehumidifies the gas and introduces air or oxygen, if necessary, to the gas, and then recycles the reconditioned gas back to the suit. As far as the present invention is concerned, it is immaterial which system, i.e., open or closed, is employed to supply ventilating gas to the suit inlet 36. Accordingly, in the ensuing description, it will be simply assumed that the inlet 36 receives precooled and dehumidified gas from a source (not shown) and the gas exhausts from the suit to a suitable receiver, which may be the gas source, atmosphere, or some other receiving means.

Environmental suit 20, and its ventilation gas distribution system 34, as thus far described, is conventional. As noted earlier, such a ventilation system is inadequate or completely unusable under many conditions or environment and physical activity because of the fact that a high percentage of the heat load of the wearer's body is removed by latent cooling, resulting in an excessive sweat rate, and body heat storage, rather than by sensible cooling. The improved suit ventilation system 22 of this invention, which includes the gas distribution system 34, cures this deficiency.

Essentially, the ventilation system 22 is so arranged that the ventilating gas entering into heat transfer relation with each of at least two different surface areas of the wearer's body is freshly cooled and dehumidified. According to the preferred practice of the invention, and that illustrated in the drawings, this is accomplished by delivering cool, dry gas to one surface area and recooling and dehumidifying the gas as it flows from said one surface area to an adjacent surface area. The same result could be obtained in other ways, however, as by exhausting the gas from each surface area, recooling and dehumidifying the emerging gas, and recycling the reconditioned gas back to the same surface area.

In the ensuing description, each recooling function, and the means for accomplishing such function, is referred to in places as a cooling cycle. As will appear to those skilled in the art, the number of cooling cycles required in a particular environmental suit will depend on many parameters, including the metabolic rate and normal sweat rate of the wearer, external environmental conditions, the expected physical activity of the wearer, and others. Actually, one unique and highly important advantage of this invention resides in the fact that the ventilation system can be tailored to any given set of relevant parameters or conditions by varying the number and thermodynamic characteristics of the cooling cycles, their placement, and so on. Accordingly, the number and placement of the cooling cycles shown in each of the illustrated environmental suits should be regarded as purely illustrative.

Figure 2:
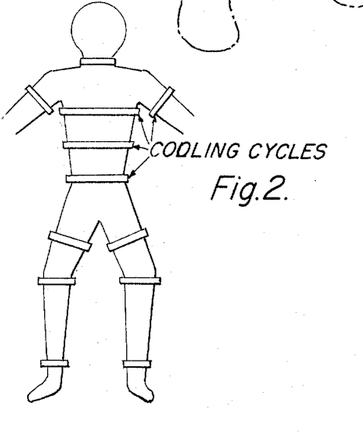
FIG. 2 illustrates various possible body locations where certain heat exchangers of the suit ventilation system of FIG. 1 may be placed.

Proceeding now to the illustrated suit ventilating system 22, the latter comprises a system 44 of heat exchangers, or cooling cycles, 46 and 48, shown as three in number, which are strategically placed in certain flow paths of the ventilating gas through the environmental suit 20. In FIG. 1, for example, each cooling cycle 46 is located on a thigh of the wearer near the knee and the cooling cycle 48 is at chest level. FIG. 2 illustrates several possible cooling cycle locations.

The two cooling cycles 46 are identical and the remaining cycle 48 is essentially identical to the cycles 46, differing from the latter only in dimension. Each cooling cycle comprises a finned tube heat exchanger of the type shown best in FIGS. 3 and 4. While these figures represent a section through one of the cooling cycle exchangers 46, the following description of the latter will obviously apply to the exchanger of cycle 48.

The heat exchanger 50 shown in FIGS. 3 and 4 comprises a tube 52, which may be a brass tube, for example. Brazed or otherwise joined to the tube 52, along substantially its entire length, are a multiplicity of heat transfer fins 54. This finned heat exchanger structure may be fabricated in any convenient way. The heat exchangers 50 of the cooling cycle 46 are coiled into rings of a diameter to fit closely about the wearer's thighs. The heat exchanger 50' of cooling cycle 48 is coiled into a ring of a diameter to fit closely about the wearer's chest. Each exchanger may be provided with inner and outer protective layers 56 of fabric or other material to protect the wearer and the wall of the suit 20 against cutting and abrasion by the fins 54. The heat exchangers may be retained in position solely by their frictional contact with the wearer or, preferably, by ancillary supporting means, not shown, to avoid pressure points.

In FIGS. 3 and 4 it will be observed that when the cooling cycles 46 and 48 are in operative position, they extend across the ventilating gas flow space S between and engage the wall of the suit 20 and the body B of the wearer. In FIGS. 3 and 4, numeral 58 denotes an absorbent material which is interposed between the heat exchanger and the wearer's skin so that the exchanger has direct contact with the material 58 rather than with the skin. This material serves as a wick to convey condensed moisture away from the heat exchanger, as explained shortly, and may comprise a special wicking material or simple underwear worn by the wearer of the suit.

Referring again to FIG. 1, numeral 60 denotes a fluid conduit which connects, via the branch conduits 61, to one end of each heat exchanger tube 52. Numeral 62 denotes a fluid conduit which connects, through other branch conduits 63, to the other end of each heat exchanger tube. Conduit 60 serves to convey a fluid coolant, preferably a liquid coolant, to the heat exchangers. Conduit 62 exhausts the coolant from the exchangers. In some cases, the coolant system may be an open system, in which event the inlet conduit 60 will receive coolant from a source (not shown) and the exhaust conduit 62 will exhaust the spent coolant to a suitable receiver (not shown). In other cases, the coolant system may be a closed system, in which case both conduits 60 and 62 will be connected to a cooling unit which receives spent coolant from the suit, recools the coolant, and recycles the latter back to the suit. Which coolant system, i.e., open or closed, is utilized is immaterial to the invention. Accordingly, it will be assumed in the ensuing description that the inlet conduit 60 simply receives coolant at the desired low temperature from a source (not shown) and the exhaust conduit 62 exhausts the spent coolant to a suitable receiving means, which may or may not be the coolant source.

In operation of the invention, precooled and dehumidified ventilating gas is supplied to the gas inlet 36 of the environmental suit 20 and flows through the distributing system 34 into the outer ends of the suit arms 26 and the lower ends of the suit legs 28. The gas then flows upwardly between the suit wall and the body B of the wearer to the gas outlet 40, in the manner described earlier. As the gas traverses the body surfaces, it extracts heat from the body by both latent and sensible cooling processes. The gas is thereby warmed and acquires increased moisture content. As will appear shortly, however, most of the body heat load is removed by sensible cooling, whereby excessive sweating and body heat storage is avoided. The ventilating gas flowing upwardly along each leg of the wearer passes through the heat exchanger 50 of the respective lower cooling cycle 46 as the gas flows from the calf area to the thigh area of the leg. The gas flows emerging from the two legs then merge and pass through the heat exchanger 50' of the upper cooling cycle 48 as the combined gas flows from the lower chest area to the upper chest area of the wearer.

During passage of the ventilating gas through each cooling cycle, the gas is cooled by heat loss to the coolant flowing through the cycle and moisture entrained in the gas condenses on the heat exchanger surfaces of the cooling cycle. In a typical ventilating system according to the invention, for example, the ventilating gas may enter a cooling cycle at a temperature on the order of 85° F. and emerge from the cycle at a temperature on the order of 55° F. The ventilating gas thus undergoes stepwise heating and cooling as it flows upwardly from one surface area of the body to the next. The ventilating gas temperature to which each incremental surface area of the body is exposed is thus lower than with a contemporary suit ventilation system.

Figure 5:
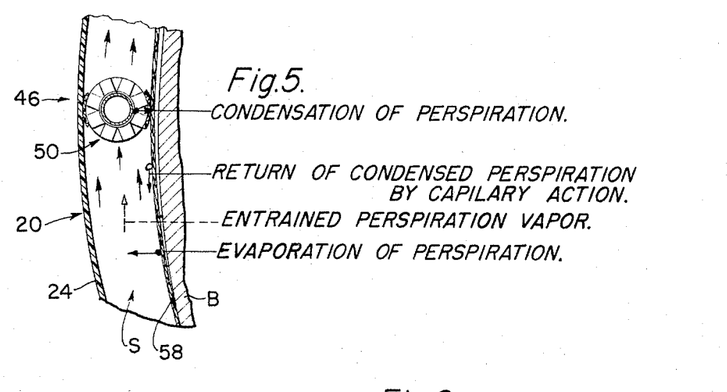
FIG. 5 illustrates certain thermodynamic actions which occur during operation of the ventilating system of FIG. 1.
Figure 6:
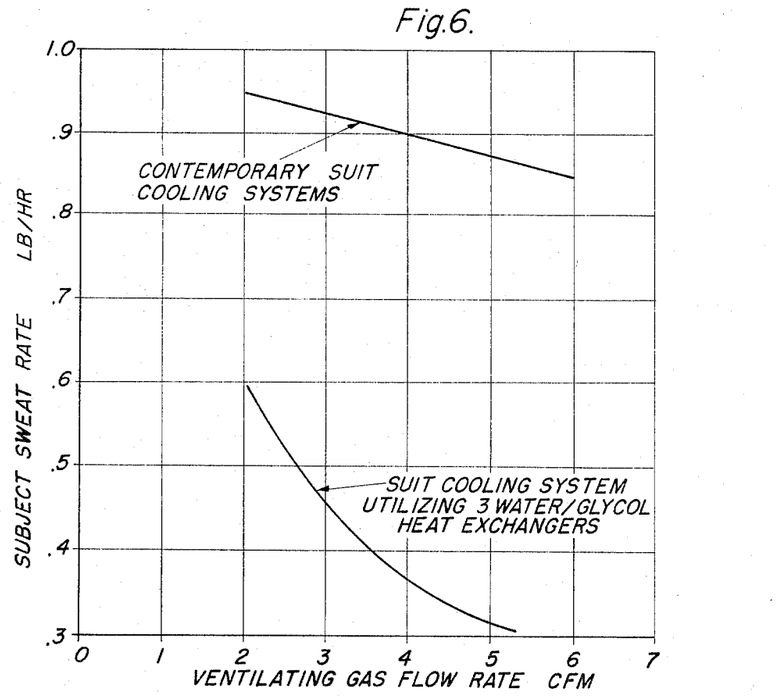
FIG. 6 is a chart comparing the sweat rates of a subject wearing an environmental suit equipped with a contemporary ventilating system and with the present improved ventilating system.

In addition, a repetitious moisture condensation and evaporation process, illustrated in FIG. 5, occurs at each cooling cycle and the adjacent body surface areas which provides a large latent cooling effect without increasing the latent heat load, i.e., sweating, of the wearer. Thus, as the ventilating gas traverses the body surface area preceding each cooling cycle, the gas acquires moisture, i.e., perspiration, by evaporation from the area. During subsequent flow of the gas through the cooling cycle to the next surface area of the body, some of the entrained moisture condenses out on the heat exchanger surfaces of the cycle. Condensed moisture is absorbed in the wicking or wick-like material 58 in contact with each exchanger and is carried by capillary action into heat transfer relation to the body surface area preceding and/or following the respective cooling cycle. This condensed moisture is then reevaporated by body heat and subsequently recondensed during flow of the ventilating gas through the following cooling cycle. Such a repetitious condensing-revaporation process occurs across each cooling cycle and provides a large cooling effect without increasing the latent heat load, i.e., sweat rate, of the wearer. Due to the repetitious nature of this process, the cooling effect provided by a small amount of perspiration is amplified many times.

The end result of the present cascade cooling technique is to increase the proportion of the total body heat load removed by sensible cooling and reduce the proportion of the total heat load removed by latent cooling due to evaporation of body moisture from the skin of the wearer. The sweat rate of a person when wearing an environmental suit ventilated by the present ventilation method and system is thus substantially less than when wearing a suit ventilated by contemporary methods and systems. Tests have indicated, for example, that a 65 percent reduction or greater in latent cooling (sweat rate) is possible with the present invention. Increasing the number of cooling cycles employed has the dual effect of increasing sensible cooling and reducing the required flow rate of ventilation gas. If enough cooling cycles were employed, substantially the entire heat load could be removed by sensible cooling. With regard to the reduction in ventilation gas flow rate permitted by increasing the number of cooling cycles, it is necessary, in an environmental suit of the type illustrated, to maintain at least a certain minimum gas flow to assure adequate breathing oxygen for the wearer and proper $CO_2$ washout from the helmet 30. Any reduction in required ventilation gas flow, however, is extremely advantageous since it results in a substantial reduction in the overall power requirements for the suit.

The present suit ventilating method and system are self-servoing or self-regulating in that the more heat the wearer generates, the more effective the cooling cycles become. This is due to the fact that increased body heat results in a higher sweat rate and, therefore, in increased evaporation of moisture from the skin and increased latent cooling by the repetitious condensation-evaporation process referred to earlier. This is important, particularly under conditions where the wearer is subjected to varying physical and/or psychological stress.

The present suit ventilating system can be tailored to particular conditions and individuals, as noted earlier. In this regard, it has been found that regulating coolant flow in the coolant circuit of the system is much more effective to regulate cooling rate than regulating ventilation gas flow. An example of a liquid coolant suitable for use in the system is a water-glycol mixture.

The wicking 58 shown in FIG. 4 is particularly necessary in zero-G applications for collecting condensed moisture from the cooling cycle heat exchangers and conveying the moisture into heat transfer relation to the body surface. Conceivably, other means for this purpose may be employed, particularly in normal-G applications, such as simply permitting the moisture to drain directly onto the skin. Wicking is preferred, however.

At this point, it is evident that the ventilation method involved in the operation of the ventilation system 22 of FIG. 1 comprises the direction of cool ventilating gas into heat transfer relation with the surface of a body, recooling the gas emerging from different areas of the body, and recycling the gas back into heat transfer relation with the body. More specifically, the method of operation of the illustrated cascade system involves periodic recooling, or periodic renewal of the cooling capacity, of the ventilating gas the latter traverses the wearer's body. In the cascade system, of course, it is considered to be within the scope of the invention to recool the ventilating gas but once as it emerges from one surface area of the body and enters another.

Various types of heat exchanger arrangements may be used to provide the cooling cycles of the invention. A few possible alternative arrangements will now be described. In each case, the basic environmental suit construction, including its ventilation gas distribution system, and the ventilating method involved are substantially the same as described above. Accordingly, no detailed description of either will be given. In each case, three cooling cycles are shown. These and the basic environmental suit structure will be designated by the same numerals as in the earlier description.

Figure 7:
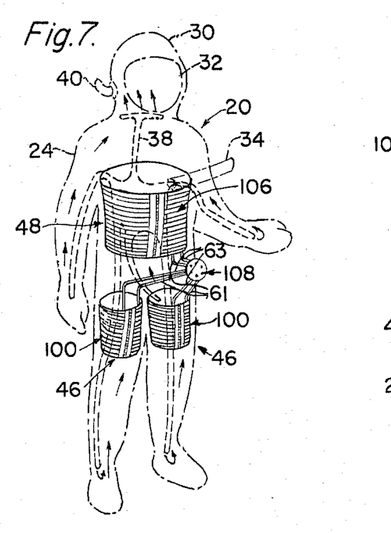
FIG. 7 illustrates a modified environmental suit ventilating system according to the invention.
Figure 8:
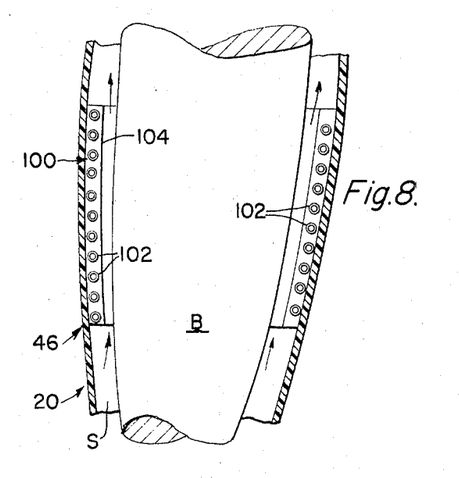
FIG. 8 is an enlarged section through one of the heat exchangers embodied in the ventilating system of FIG. 7.
Figure 12:
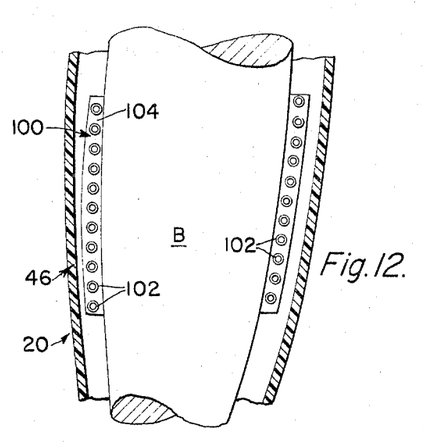
FIG. 12 is an enlarged section through one of the heat exchangers in the ventilating system of FIG. 11.

In FIGS. 7 and 8, each cooling cycle 46 comprises a heat exchanger including one long flexible tube 102, or several shorter, communicating tubes, mounted on a flexible sleeve-like support 104 which encircles the adjacent part of the body. The heat exchanger 106 of cooling cycle 48 is the same, except for its larger dimensions. The tubing 102 may be vinyl and the support 104 may be fabric to which the tubes are joined in some convenient way. Coolant is delivered to and exhausted from the heat exchangers through a system 108 of conduits so that the coolant flows through the exchangers, as before. Each heat exchanger may be carried by the wall of the environmental suit 20 or by the wearer. In FIGS. 7 and 8, the heat exchangers are carried by the suit. The ventilating gas flows between the body B of the wearer and the tubes 102, in heat transfer relation to the latter. In FIG. 12, the heat exchanger 100 is shown to be carried by the wearer.

Figure 9:
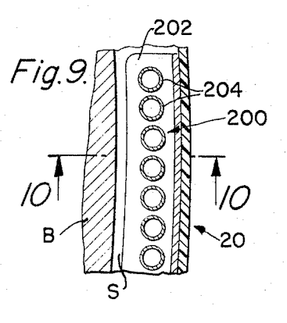
FIG. 9 illustrates a slightly modified heat exchanger construction for use in the ventilating system of FIG. 7.
Figure 10:
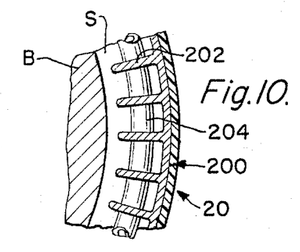
FIG. 10 is a section taken on line 10—10 in FIG. 9.

FIGS. 9 and 10 show an alternative heat exchanger construction for each cooling cycle of the present ventilating system. This modified exchanger comprises vertical fins 202 and horizontal coolant tubes 204 extending through the tubes. In this case, as in FIGS. 7 and 8, the heat exchanger is carried by the environmental suit. Ventilating gas flow occurs upwardly between the fins 202 and over the tubes 204, which are supplied with coolant, as before.

Figure 11:
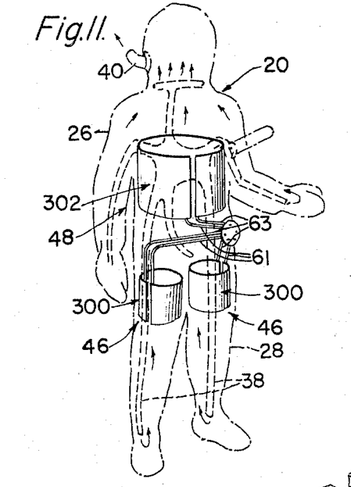
FIG. 11 illustrates a further modified suit ventilating system according to the invention.
Figure 13:
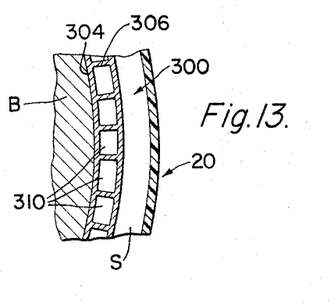
FIG. 13 illustrates a slightly modified heat exchanger construction for use in the ventilating system of FIG. 11.
Figure 14:
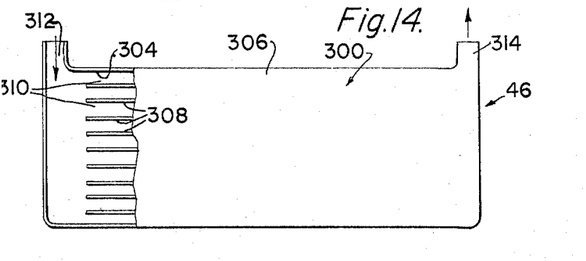
FIG. 14 is a side view of the heat exchanger in FIG. 13, with parts broken away to illustrate the interior of the exchanger.

FIGS. 11, 13 and 14 show a suit ventilation system according to the invention in which the heat exchanger 300 of each cooling cycle 46 and the heat exchanger 302 of cooling cycle 48 are of the shroud type. As shown best in FIGS. 13 and 14, each exchanger comprises a flexible sleeve having inner and outer layers 304 and 306 bonded together about their edges and inner walls 308 separating the layers and defining flow passages 310 therebetween. Coolant, which is supplied to each exchanger in the manner described earlier, enters the exchanger through a manifold passage 312 and emerges through a manifold passage 314, both communicating to the interior passages 310. Heat exchanger 302 is the same except for dimensions. In FIG. 13, the heat exchanger 300 is shown to be carried by the body B of the wearer so that ventilating gas flow occurs between the exchanger and the wall of the environmental suit 20. The exchanger may be finned.

Figure 15:
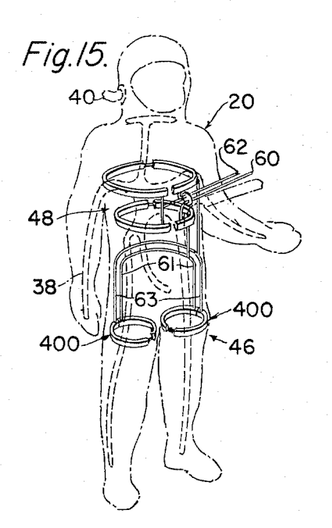
FIG. 15 illustrates a further modified suit ventilating system according to the invention.
Figure 16:
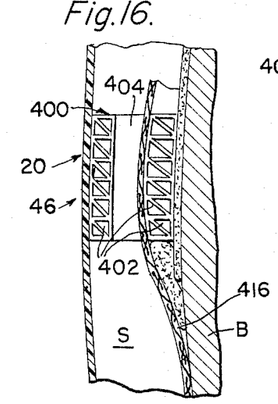
FIG. 16 is an enlarged section through one of the heat exchangers in the ventilating system of FIG. 15.
Figure 17:
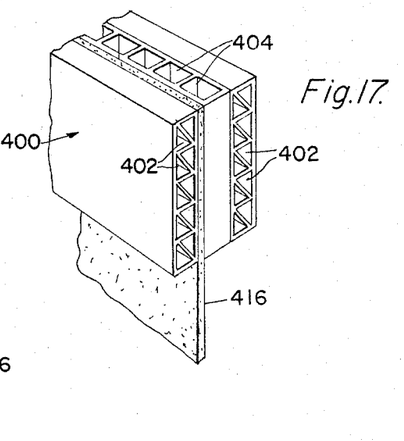
FIG. 17 is an enlarged perspective view, partly sectioned, of the heat exchanger in FIG. 16.
Figure 18:
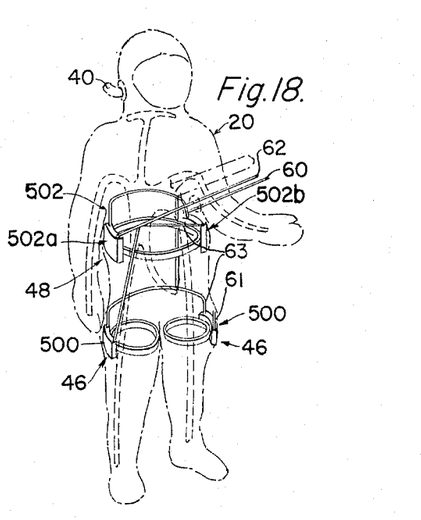
FIG. 18 illustrates yet a further modified suit ventilating system according to the invention.

FIGS. 15–17 show a further modified heat exchanger arrangement in which the exchangers 400 of the lower cooling cycles 46 comprise metal rings having inner and outer coolant flow passages 402 and vertical passages 404 between the coolant passages through which flows the suit ventilating gas. Heat exchanger 302 is the same except for size. The coolant passages are supplied with coolant, as before. The heat exchanger rings may be carried by the suit or the wearer.

In FIGS. 16 and 17, 406 is a porous wicking for conveying condensed moisture from the exchanger into heat transfer relation to the body of the wearer, for the reasons explained earlier.

Figure 19:
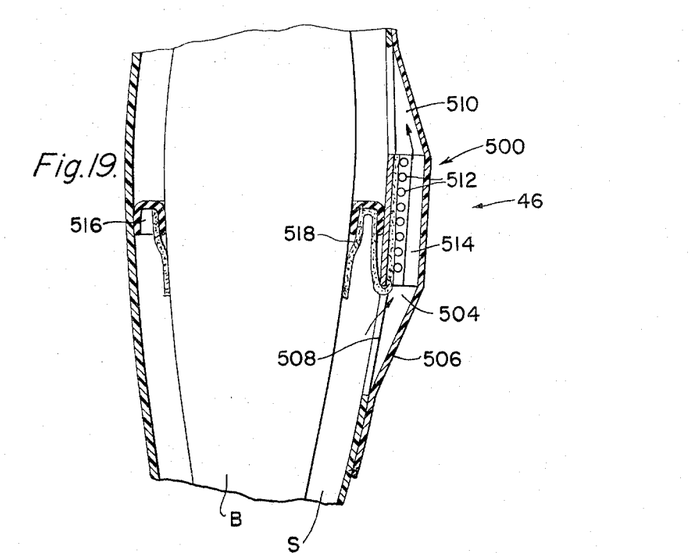
FIG. 19 is an enlarged section through one of the heat exchangers in the ventilating system of FIG. 18.

Referring finally to FIGS. 17 and 19, the numeral 500 denotes the heat exchanger of each lower cooling cycle 46 and numeral 502 designates the heat exchanger of the upper cycle. These exchangers are identical except for the larger size of the upper exchanger, which actually comprises two separate exchangers 502a and 502b. As shown best in FIG. 19, each exchanger 500 fits in an external pocket 504 on the environmental suit 20. This pocket is formed by a piece 506 bonded to the wall of the suit. The upper and lower ends of the pocket open to the ventilating gas passage through ports 508 and 510 in the suit. The heat exchangers 502a and 502b are similarly mounted.

Each heat exchanger has horizontal coolant passages 512 and vertical ventilation gas passages 514 disposed in heat transfer relation to the coolant passages. A seal ring 516 is placed about the body of the wearer opposite each exchanger, between the respective pocket openings 508 and 510.

During operation of the ventilating system, ventilating gas flowing upwardly through the flow passage S between the wearer's body B and the wall of suit 20 is diverted, at each cooling cycle 46 and 48, by the respective seal ring 516 into the adjacent heat exchanger pocket 504 through its lower wall opening 508. The gas flows through the respective heat exchanger 500 or 502, as the case may be, and then back into the main gas passage S through the upper pocket wall opening 510. This arrangement is desirable since it permits installation of the present ventilating system in environmental suits which have insufficient space in the flow passage S to receive the heat exchangers. Added comfort is another advantage. A wicking 518 is provided for the reasons stated earlier.

Whether the heat exchangers in FIGS. 7–17 are carried by the suit or the wearer is dependent, in part, upon whether or not heat transfer by conduction from the body to the heat exchangers is desirable or necessary for proper operation of the ventilating systems.

Various modifications in the design, arrangement of parts, and instrumentalities of the invention are possible within its spirit and scope.

We claim:
1. The method of ventilating the surface of a human body, which comprises the steps of:
  introducing and directing a ventilating gas over the body surface,
  periodically thermodynamically conditioning the gas as it flows from one surface area to an adjacent surface area, and thereafter removing the ventilating gas from the immediate environment of the body.

2. The method of ventilating the surface of and cooling a human body, which comprises the steps of:
   directing a ventilating gas into heat transfer relation with a surface area of the body,
   cooling the gas as it emerges from said surface area, thereby to condense moisture entrained in the emerging gas, and
   collecting the condensed moisture and conveying the latter into heat transfer relation to said surface area, whereby the condensed moisture is reevaporated by body heat and subsequently recondensed.

3. The method of ventilating the surface of and cooling a human body, which comprises the steps of:
   directing a precooled ventilating gas successively into heat transfer relation with at least two separate surface areas of the body,
   recooling the gas as it flows from one surface area to the other, thereby to condense moisture entrained in the gas as the latter emerges from said one surface area to said other surface area, and
   collecting the condensed moisture and conveying the latter into heat transfer relation to one of said surface areas of said body.

4. The method of ventilating the surface of a living body, which comprises the steps of:
   introducing and directing a ventilating gas into heat transfer relation with at least two separate surface areas of the body,
   thermodynamically conditioning the gas emerging from each area,
   redirecting the conditioned gas from each area back into heat transfer relation with the body, and
   thereafter removing the ventilating gas from the immediate environment of the body.

5. The method of ventilating a human body enclosed in an environmental suit, which comprises the steps of:
   introducing and directing a ventilating gas over the body surface between the latter and the wall of said suit,
   thermodynamically conditioning the gas prior to flow of the gas over each of at least two separate body surface areas, and
   thereafter removing the ventilating gas from the immediate environment of the body.

6. The method of ventilating a human body enclosed in an environmental suit having arm and leg members to receive the arms and legs of said body, which comprises the steps of:
   introducing a precooled ventilating gas from the exterior into the interior of said suit adjacent the extremities of at least some of said members and exhausting the gas to the exterior from another point of the suit in such manner that the gas flows over the surface of said body, and
   periodically thermodynamically reconditioning said gas within the body enclosing wall of said suit to restore the cooling capacity of the gas as the latter flows from one body surface area to an adjacent surface area.

7. The method according to claim 6 wherein said reconditioning step comprises the steps of:
   cooling said gas and condensing moisture vapor entrained in the gas,
   collecting the condensed moisture, and
   conveying the condensed moisture into heat transfer relation with an adjacent surface area of said body.

8. A system for ventilating an environmental suit to be worn by a person in such manner that a gas flow passage exists between the body surface of the person and the wall of the suit, comprising:
   inlet means for introducing thermodynamically conditioned ventilating gas into said suit and thence into said passage at one point,
   exhaust means for exhausting said gas from said suit and said passage at another point, whereby said gas flows through said passage from said inlet to said exhaust and over the body of the person wearing the suit, and
   means in said flow path for thermodynamically reconditioning said gas as the latter flows from one portion of said passage to an adjoining portion of the passage.

9. A system for ventilating an environmental suit to be worn by a person in such manner that a gas flow passage exists between the body surface of the person and the wall of the suit, comprising:
   inlet means for introducing precooled ventilating gas into said suit and thence into said passage at one point,
   exhaust means for exhausting said gas from said suit and said passage at another point, whereby said gas flows through said passage from said inlet to said exhaust and over the body of the person wearing the suit, and
   a heat exchanger within said suit between said points for recooling said gas as the latter flows from one portion of said passage to an adjoining portion of the passage.

10. A system for ventilating an environmental suit to be worn by a person in such manner that a gas flow passage exists between the body surface of the person and the wall of the suit, comprising:
    inlet means for introducing precooled ventilating gas into said suit and thence into said passage at one point,
    exhaust means for exhausting said gas from said suit and said passage at another point, whereby said gas flows through said passage from said inlet to said exhaust and over the body of the person wearing the suit, and
    means for periodically recooling said gas as the latter flows through said passage.

11. A ventilating system according to claim 9 including:
    means disposed in fluid conducting relation to said heat exchanger for collecting moisture which condenses on the exchanger and conveying the condensed moisture into heat transfer relation with the body surface of the person wearing the suit.

12. A ventilating system according to claim 9 wherein:
    said heat exchanger is annular in shape and disposed so as to encircle the adjacent portion of the body of the person wearing the suit.

13. A ventilating system according to claim 9 wherein:
    said heat exchanger is attached to the wall of said suit.

14. A ventilating system according to claim 9 wherein:
    said heat exchanger is contained in a pocket in the wall of said suit communicating to said passage through two spaced openings, and
    means for sealing the suit wall to the body of the person wearing the suit, thereby to induce gas flow from said passage into said exchanger through one pocket opening and from the exchanger back to said passage through the other pocket opening.

15. Apparatus for thermally conditioning a portion of a living body having said portion encased in a substantially impermeable garment, comprising:
    heat transfer means having first and second fluid flow passageways in efficient heat transfer relationship;
    means providing a flow of a thermally conditioning fluid through one of said passageways;
    means providing a flow through the other of said passageways of a fluid to be thermally conditioned in said heat transfer means by said thermally conditioning fluid; and
    means on said heat transfer means for disposing the same intermediate a portion of said garment and said body portion in a substantially fixed relation thereto and in such manner that at least a substantial portion of said fluid to be thermally conditioned flows successively in heat transfer relation with a portion of the surface of said body portion, thence through said other of said passageways and thence in heat transfer with another portion of the surface of said body portion.

16. The apparatus of claim 15 in which said heat transfer means is secured to said garment.

17. Apparatus for thermally conditioning a portion of a living body having said portion encased in a substantially impermeable garment, comprising:
  first heat transfer means having first and second fluid flow passageways;
  second heat transfer means having first and second fluid flow passageways;
  means providing a flow of a thermally conditioning fluid through said first passageways of said first and second heat transfer means;
  means providing a flow through said second passageways of a fluid to be thermally conditioned in said heat transfer means by said thermally conditioning fluid; and
  means on both said heat transfer means for disposing the same in spaced apart relation intermediate a portion of said garment and said body portion in a substantially fixed relation thereto and in such manner that at least a substantial portion of said fluid to be thermally conditioned flows successively through said second passageway of said first heat transfer means, thence in heat transfer relation with a portion of the surface of said body portion and thence through said second passageway of said second heat transfer means.

18. The apparatus of claim 17 in which both said heat transfer means are secured to said garment.

19. Apparatus for thermally conditioning a portion of a living body having said portion encased in a substantially impermeable garment, comprising:
  heat transfer means having first and second fluid flow passageways in efficient heat transfer relationship;
  means providing a flow of a thermally conditioning fluid through one of said passageways;
  means providing a flow through the other of said passageways of a fluid to be thermally conditioned in said heat transfer means by said thermally conditioning fluid;
  absorbent material means depending from said heat transfer means and arranged to receive condensate from said other of said passageways; and
  means on said heat transfer means for disposing the same and said absorbent material means intermediate a portion of said garment and said body portion in a substantially fixed relation thereto and in such manner that at least a substantial portion of said fluid to be thermally conditioned flows successively in heat transfer relation with a portion of the surface of said body portion, thence through said other of said passageways and thence in heat transfer with another portion of the surface of said body portion, and whereby evaporation of the condensate in said absorbent material means by said body portion enhances the cooling effect thereon.

20. A system for ventilating an environmental suit to be worn by a person in such manner that a gas flow passage exists between the body surface of the person and the wall of the suit, comprising:
  first means for introducing thermodynamically conditioned ventilating gas into said passage at one point,
  second means for introducing thermodynamically conditioned ventilating gas into said passage at another point,
  means for exhausting ventilating gas from the suit,
  one of said first and second means comprises a cooling medium which cools the ventilating gas and condenses entrained moisture vapor from the gas, and
  means disposed in fluid conducting relation to said medium for collecting the condensed moisture and conveying the latter into heat transfer relation with the body surface of the person wearing the suit.

References Cited by the Examiner

UNITED STATES PATENTS

| | | | |
|---|---|---|---|
| 2,415,455 | 2/1947 | Barnes et al. | 62—259 X |
| 3,000,190 | 9/1961 | Stark | 62—259 |
| 3,000,616 | 9/1961 | Spangler | 165—46 |
| 3,049,896 | 8/1962 | Webb | 62—259 X |
| 3,064,448 | 11/1962 | Whittington | 62—259 |
| 3,085,405 | 4/1963 | Frantti | 62—259 |

EDWARD J. MICHAEL, *Primary Examiner.*